United States Patent
Mao et al.

(10) Patent No.: US 10,615,679 B2
(45) Date of Patent: Apr. 7, 2020

(54) VIBRATION MOTOR

(71) Applicant: AAC Technologies Pte. Ltd., Singapore (SG)

(72) Inventors: Lubin Mao, Shenzhen (CN); Zhaoxian Chen, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 16/233,448

(22) Filed: Dec. 27, 2018

(65) Prior Publication Data

US 2019/0207497 A1 Jul. 4, 2019

(30) Foreign Application Priority Data

Jan. 3, 2018 (CN) .......................... 2018 1 0004768

(51) Int. Cl.
*H02K 33/14* (2006.01)
*B06B 1/04* (2006.01)
*H02K 35/02* (2006.01)

(52) U.S. Cl.
CPC ............. *H02K 33/14* (2013.01); *B06B 1/045* (2013.01); *H02K 35/02* (2013.01); *H02K 2201/06* (2013.01)

(58) Field of Classification Search
CPC ........ B06B 1/045; H02K 33/14; H02K 35/02; H02K 2201/06; H02K 33/02
See application file for complete search history.

(56) References Cited

U.S. PATENT DOCUMENTS

| | | | | |
|---|---|---|---|---|
| 6,008,561 A | * | 12/1999 | Tang | .................... H02K 19/103 310/180 |
| 2012/0169148 A1 | * | 7/2012 | Kim | ...................... H02K 33/16 310/25 |
| 2015/0155761 A1 | * | 6/2015 | Richard | ................. H02K 11/33 310/68 D |
| 2016/0013710 A1 | * | 1/2016 | Dong | ..................... H02K 33/16 310/25 |
| 2017/0012518 A1 | * | 1/2017 | Wang | ..................... H02K 33/16 |
| 2017/0033651 A1 | * | 2/2017 | Mao | ........................ H02K 33/16 |
| 2017/0033663 A1 | * | 2/2017 | Wang | ..................... H02K 33/00 |
| 2017/0070132 A1 | * | 3/2017 | Wang | ..................... H02K 33/16 |
| 2017/0110947 A1 | * | 4/2017 | Mao | ........................ H02K 5/04 |
| 2017/0117790 A1 | * | 4/2017 | Mao | ........................ H02K 1/34 |
| 2017/0117791 A1 | * | 4/2017 | Mao | ........................ H02K 1/34 |
| 2017/0117793 A1 | * | 4/2017 | Mao | ....................... H02K 99/20 |
| 2017/0120297 A1 | * | 5/2017 | Chun | ..................... H02K 33/16 |
| 2017/0120298 A1 | * | 5/2017 | Mao | ........................ B06B 1/045 |

(Continued)

*Primary Examiner* — Alex W Mok
(74) *Attorney, Agent, or Firm* — IPro, PLLC; Na Xu

(57) ABSTRACT

The present disclosure provides a vibration motor. The vibration motor includes a housing having a bottom wall and a side wall, a vibrator received in the housing, and an elastic member supporting vibration of the vibrator. The side wall includes a first side wall extending in a long axis direction of the vibration motor and a second side wall extending in a short axis direction of the vibration motor. The coil is disposed inclined to the first side wall. The vibration motor provided by the present disclosure can simultaneously provide driving forces in two directions of X and Y, achieves dual-f0 vibration output, and is simple in structure, so that not only the working band is effectively expanded, but also the vibration effect is enriched.

8 Claims, 3 Drawing Sheets

(56) References Cited

U.S. PATENT DOCUMENTS

| | | | |
|---|---|---|---|
| 2017/0144191 A1* | 5/2017 | Mao | B06B 1/045 |
| 2017/0179804 A1* | 6/2017 | Xu | H02K 33/16 |
| 2017/0222532 A1* | 8/2017 | Wang | H02K 33/16 |
| 2017/0288521 A1* | 10/2017 | Jin | H02K 33/02 |
| 2017/0288524 A1* | 10/2017 | Jin | H02K 5/225 |
| 2017/0341108 A1* | 11/2017 | Mao | B06B 1/045 |
| 2017/0366077 A1* | 12/2017 | Oonishi | H02K 11/046 |

* cited by examiner

VIBRATION MOTOR

CROSS-REFERENCE TO RELATED APPLICATIONS

This application claims the priority benefit of Chinese Patent Application Ser. No. 201810004768.4 filed on Jan. 3, 2018, the entire content of which is incorporated herein by reference.

TECHNICAL FIELD

The present disclosure relates to a vibration motor, and more particularly to a vibration motor applied to portable consumer electronics.

BACKGROUND

With the development of an electronic technology, portable consumer electronics are increasingly sought after by people, such as mobile phones, handheld game consoles, navigation devices or handheld multimedia entertainment devices etc., which generally use vibration motors to perform system feedback, for example call reminders, message reminders and navigation reminders of mobile phones, and vibration feedback of game consoles. Such a wide range of application requires high performance and long service life of a vibration motor.

The vibration motor generally includes a magnetic vibrator and a driving device for driving vibration of the magnetic vibrator. The driving device is usually a coil corresponding to the magnetic vibrator. Currently, the coil of the conventional linear motor is usually placed in a Y direction. The driving device of this structure only generates a driving force in an X direction and performs single-direction drive, so only one vibration mode of this system is utilized, the band is narrow, and the vibration experience is single.

Therefore, there is a need to provide a novel vibration motor to resolve the foregoing problems.

DETAILED DESCRIPTION

The present disclosure will be further described with reference to the accompanying drawings.

Figure 1:
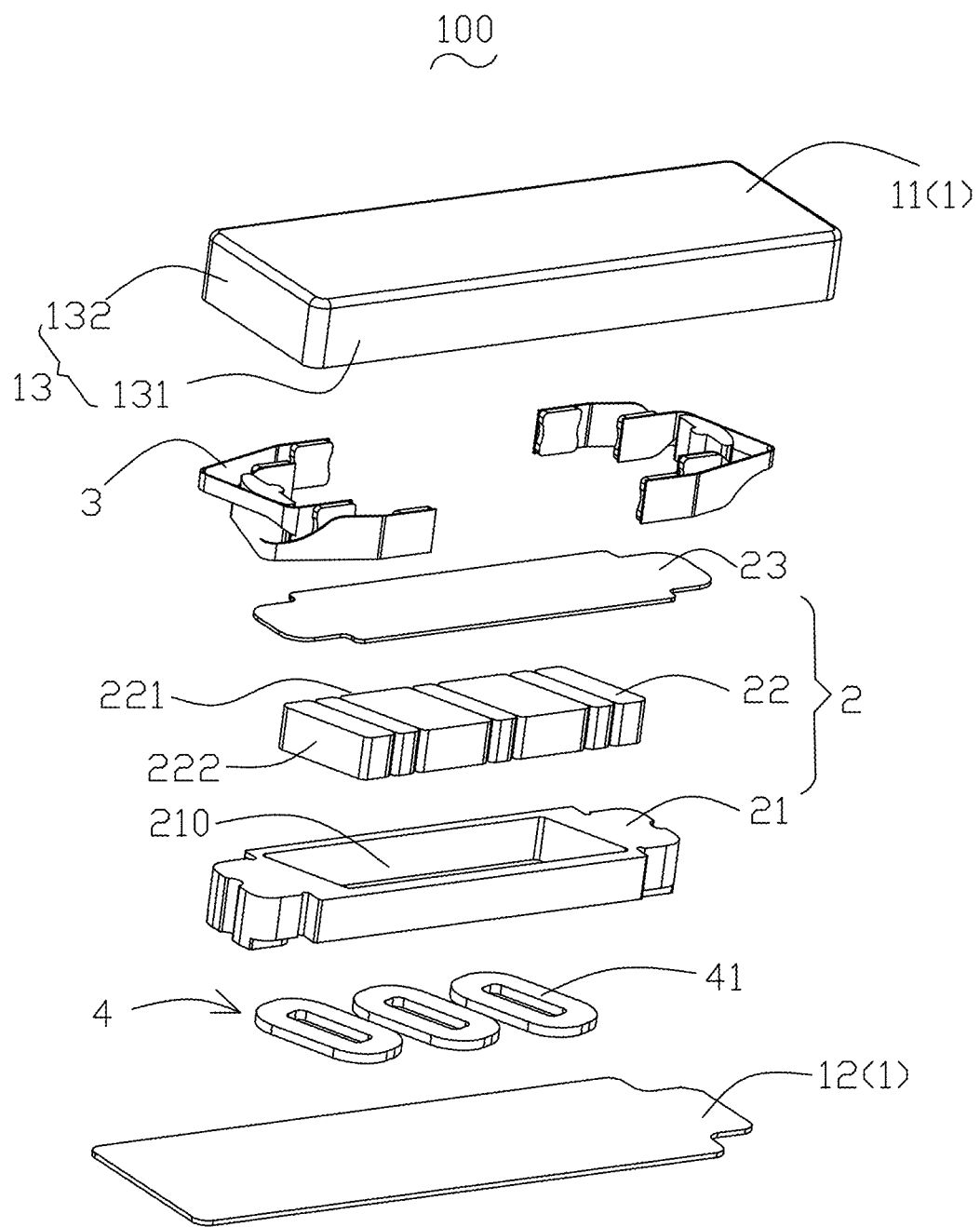
FIG. 1 is a schematic structural exploded view of a vibration motor provided by the present disclosure.
Figure 2:
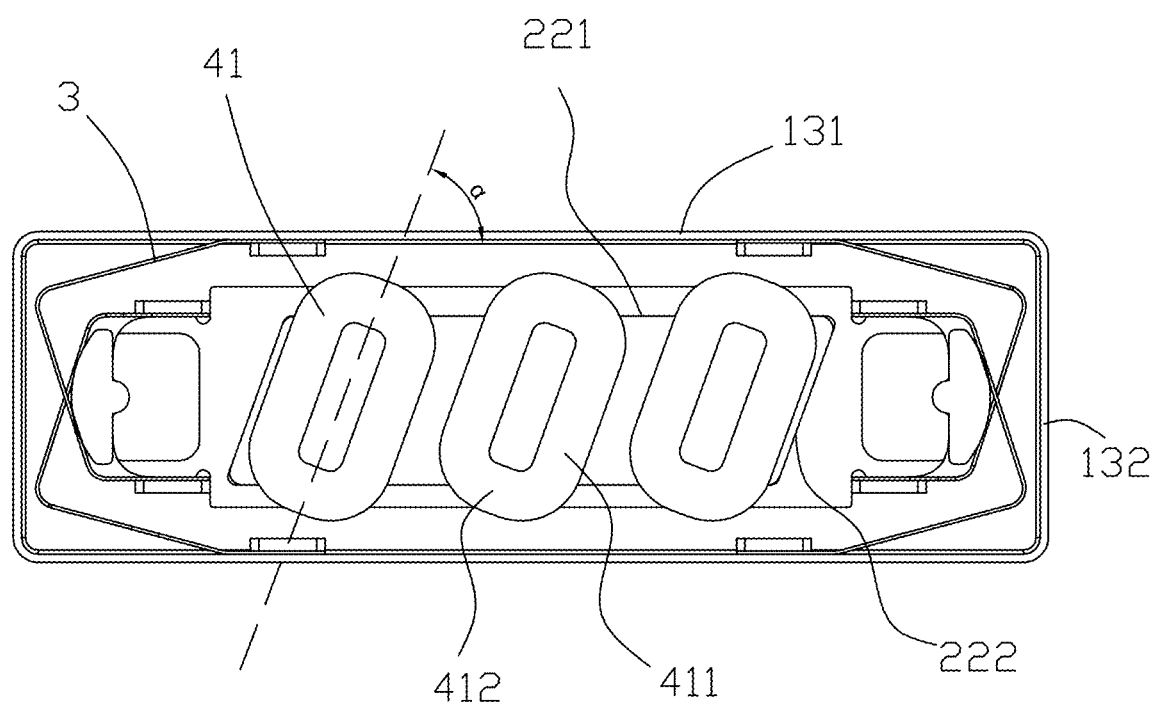
FIG. 2 is a schematic partial structural assembly view of a vibration motor provided by the present disclosure.

FIG. 1 and FIG. 2 show a vibration motor 100 provided in the present disclosure, including a housing 1, a vibrator 2 received in the housing 1, an elastic member 3 for elastically supporting the vibrator 2, and a driving device 4 for driving vibration of the vibrator 2.

The housing 1 includes a top wall 11, a bottom wall 12, and a side wall 13 connecting the top wall 11 and the bottom wall 12, and the driving device 4 is fixed on the bottom wall 12 and drives the vibrator 2 to vibrate along the bottom wall 12. The side wall 13 includes a first side wall 131 extending in a long axis direction of the vibration motor 100 and a second side wall 132 extending in a short axis direction of the vibration motor 100. The vibrator 2 includes one of a magnet steel 22 and a coil 41, the other one of the magnet steel 22 and the coil 41 serving as the driving device 4.

Specifically, in this embodiment, the vibrator 2 includes a weight 21 having a through hole 210 and a magnet steel 22 disposed inside the through hole 210, and the coil 41 serves as the driving device 4. The coil 41 is disposed inclined to the first side wall 131.

Corresponding to the coil 41, the magnet steel 22 includes two opposite first sides 221 extending along the first side wall 131, and two opposite second sides 222 disposed inclined to the first side wall 131, where the second side 222 and the coil 41 incline in the same direction. Of course, the magnet steel 22 may also be disposed in a traditional manner of being orthogonal to the first side wall 131.

The magnet steel 22 may be an entire permanent magnet or may also be formed by splicing a plurality of permanent magnets. In other optional implementations, the weight 21 may also be provided with a plurality of through holes 210 for receiving the plurality of permanent magnets.

The vibrator 2 further includes a magnetic conductive sheet 23 attached to the weight 21 and the magnet steel 22 for converging diverging magnetic induction lines to increase the magnetic induction intensity.

There are two sets of elastic members 3, which are respectively disposed on two sides of the vibrator 2, and each set of elastic members has two C-shaped springs. One end of the C-shaped spring is connected to the vibrator 2, specifically connected to the weight 21, and the other end is connected to the first side wall 131. Thus, support and vibration of the vibrator 2 is achieved.

An inclination angle at which the coil 41 is disposed inclined to the first side wall 131 is an angle $\alpha$, the angle $\alpha$ being an acute angle. The first side wall 131 and the second side wall 132 are perpendicular to each other. For convenience of description, the first side wall 131 is in an X direction, the second side wall 132 is in a Y direction, and the coil 41 is disposed inclined to the first side wall 131. In this way, in a working state, the Lorentz force exerted on the coil 41 may be decomposed into a component in the X direction and a component in the Y direction. Under the action of the two components, the vibrator 2 may obtain a resonance frequency f0 in the X and Y directions respectively to achieve dual-f0 vibration output. In addition, by setting the magnitude of the angle $\alpha$, the component of the Lorentz force exerted on the coil 41 in the X and Y directions can be changed, so as to adjust the resonance frequency of the vibration motor and expand the working band.

Specifically, in this embodiment, the coil 41 is an axisymmetric figure, and may be, for example, of a runway-type annular structure, including two parallel straight-sided portions 411 and two circular arc portions 412 respectively connected to the two straight-sided portions 411, the straight-sided portions 411 being disposed inclined to the first side wall 131.

Figure 3:
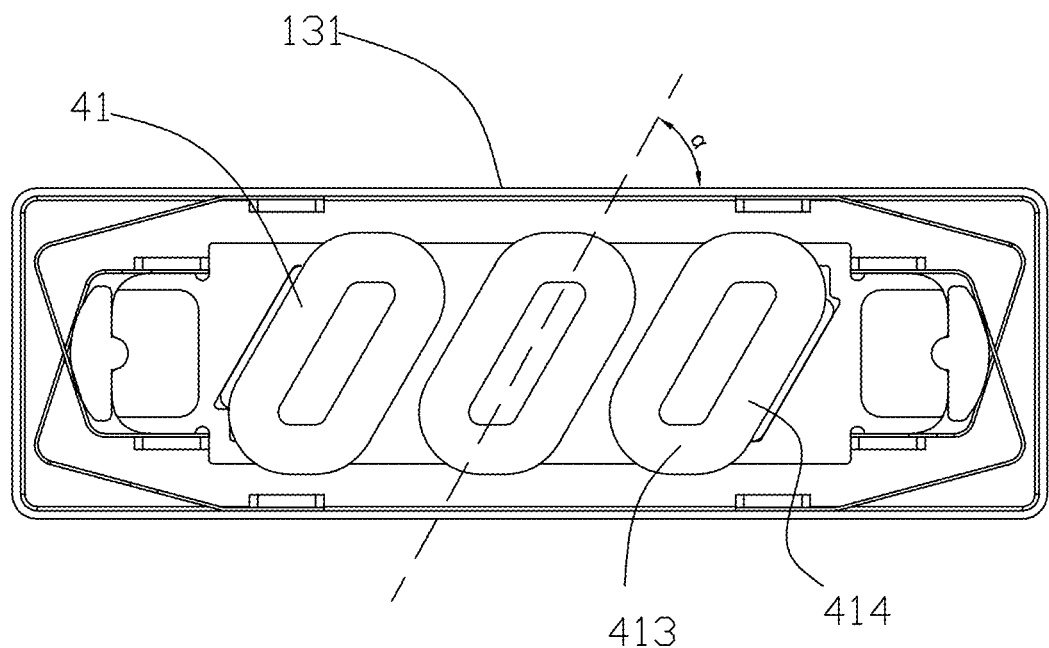
FIG. 3 is a schematic partial structural assembly view of a vibration motor in another embodiment provided by the present disclosure.

FIG. 3 shows a vibration motor in another embodiment provided by the present disclosure. The vibration motor is similar to the vibration motor 100 structurally except that the shape of the coil 41 is different. In this embodiment, the coil 41 is a centrosymmetric figure, and may be, for example, of a rhombic annular structure, including two parallel first edges 413 and two parallel second edges 414, where the first edges 413 extending along the first side wall 131, and the second edges 414 being disposed inclined to the first side wall 131. Preferably, the first edge 413 and the second edge 414 are transitioned by a circular arc. The coil 41 of such a structure can further improve the utilization of a magnetic circuit, and has better vibration performance.

The vibration motor provided by the present disclosure can simultaneously provide driving forces in two directions of X and Y, achieves dual-f0 vibration output, and is simple in structure, so that not only the working band is effectively expanded, but also the vibration effect is enriched.

Although the embodiments of the present disclosure are shown and described above, it may be understood that the foregoing embodiments are examples, and cannot be understood as limitations to the present disclosure. A person of ordinary skill in the art may make changes, modifications, replacements, and variations to the foregoing embodiments without departing from the scope of the present disclosure.

What is claimed is:

1. A vibration motor, comprising a housing having a bottom wall and a side wall, a vibrator received in the housing, and an elastic member supporting vibration of the vibrator, where the vibrator comprising one of a magnet steel and a coil, the other one of the magnet steel and the coil being disposed on the bottom wall and driving the vibrator to vibrate along the bottom wall, wherein the side wall comprises a first side wall extending in a long axis direction of the vibration motor and a second side wall extending in a short axis direction of the vibration motor, the coil being disposed inclined to the first side wall.

2. The vibration motor according to claim 1, wherein the magnet steel comprises two opposite first sides extending along the first side wall and two opposite second sides disposed inclined to the first side wall, where the second side and the coil being inclined in the same direction.

3. The vibration motor according to claim 1, wherein the coil is an axisymmetric structure.

4. The vibration motor according to claim 3, wherein the coil is a runway-type annular structure, comprising two parallel straight-sided portions disposed and two circular arc portions respectively connected to the two straight-sided portions, where the straight-sided portions being inclined to the first side wall.

5. The vibration motor according to claim 1, wherein the coil is a centrosymmetric structure.

6. The vibration motor according to claim 5, wherein the coil is a rhombic annular structure, comprising two parallel first edges and two parallel second edges disposed, the first edges extending along the first side wall, and the second edges being inclined to the first side wall.

7. The vibration motor according to claim 6, wherein the first edge and the second edge are transitioned by a circular arc.

8. The vibration motor according to claim 1, wherein the vibrator comprises a weight having a through hole and a magnet steel disposed inside the through hole, the magnet steel is disposed opposite to the coil, and the coil is disposed on the bottom wall of the housing.

* * * * *